United States Patent Office 3,419,613
Patented Dec. 31, 1968

3,419,613
PROCESS FOR PREPARING TROPONEIMINES
Tetsuo Nozoe, Sendai, and Genshun Sunagawa, Nobuo Soma, and Yoshio Sato, Tokyo, Japan, assignors to Sankyo Company, Limited, Tokyo, Japan
No Drawing. Filed May 26, 1965, Ser. No. 459,072
Claims priority, application Japan, May 30, 1964, 39/30,398
1 Claim. (Cl. 260—566)

ABSTRACT OF THE DISCLOSURE

A process for preparing 2-amino-troponeimine derivatives having the formula

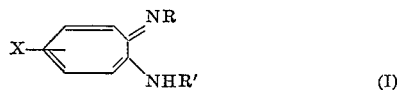  (I)

wherein X is hydrogen, straight or branched lower alkyl or phenyl; R and R' are each hydrogen, straight or branched lower alkyl, phenyl, phenyl substituted with chlorine, lower alkyl or lower alkoxy; or benzyl, provided that, when R and R' are the same, R is hydrogen, straight or branched lower alkyl, phenyl or phenyl substituted with chlorine, lower alkyl or lower alkoxy and when one of R and R' is hydrogen, the other is also hydrogen, which comprises reacting a compound having the formula

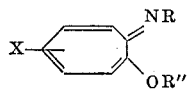

with R'–NH$_2$, wherein R" is a lower alkyl group and R, R' as well as X are as defined above. The products prepared in accordance with the invention are useful as dyes.

SUMMARY OF THE INVENTION

This invention relates to a process for preparing troponeimine derivatives of the formula

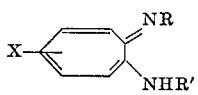

wherein X is hydrogen, straight or branched lower alkyl or phenyl; R and R' are each hydrogen, straight or branched lower alkyl, phenyl, phenyl substituted with halogen, lower alkyl or lower alkoxy; or benzyl, provided that, when R and R' are the same, R is hydrogen, straight or branched lower alkyl, phenyl or phenyl substituted with halogen, lower alkyl or lower alkoxy and when one of R and R' is hydrogen, the other is also hydrogen.

The process hitherto used for preparing the troponeimine derivatives having the types of the above Formula I is the one described in the Journal of the American Chemical Society, vol. 83, pp. 3125–3135 (1961). The prior process comprises reacting cyclopentadiene with tetrafluoroethylene to form tetrafluorobicycloheptene and converting the latter product to tetrafluorocycloheptadiene followed by reaction of the latter product with amines. However, in the prior process a pyrolytic procedure is required which is carried out at elevated temperature under reduced pressure, which calls for special equipment, so that the process must be regarded to be disadvantageous for use on an industrial scale. And, moreover, the specific troponeimine derivatives in which one of R and R' in the above Formula I represents hydrogen atom have been found to be a useful intermediate for the synthesis of the 1-substituted cycloheptimidazol-2(1H)-ones which are described in Belgian Patent No. 624,446.

According to the prior process, it is difficult to produce the specific troponeimine derivatives in which one of R and R' in the above Formula I represents hydrogen atom, as well as to synthesize the various troponeimine derivatives having substituents in the cycloheptatriene ring.

It is therefore an object of this invention to provide a novel and advantageous process for preparing the troponeimine derivatives having the above Formula I.

Other objects of this invention will become apparent from the following detailed description.

As a result of numerous investigations in order to develop a novel and advantageous process for preparing the troponeimine derivatives having the above Formula I, it has now been found that the troponeimine derivatives having the above Formula I can be prepared by reacting a 2-alkoxytroponeimine derivatives having the formula

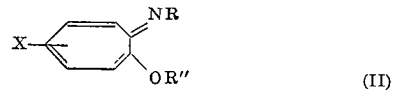  (II)

wherein R" represents a lower alky group, such as methyl or ethyl, and R and X are as defined above with an amine having the formula

R'—NH$_2$  (III)

wherein R' is as defined above.

In carrying out the process according to this invention, the reaction may be conducted in a suitable solvent. Examples of the suitable solvent to be employed include water; an aqueous inert organic solvent, such as aqueous alcohol and aqueous dioxane; and an inert organic solvent such as alcohols, for example, methanol and ethanol; aromatic hydrocarbons, for example, benzene and toluene, and dioxane. The time and temperature of the reaction are not critical features of this invention, and, usually, it is preferable to carry out the reaction at the temperature in the range of from room temperature to the reflux temperature of the solvent employed, for a period ranging from about 1 hour to about 3 days.

After completion of the reaction, the desired product may be recovered from the reaction mixture by any known procedure. For example, where the desired product is existing in the reaction mixture in solid form, the desired product may be recovered and purified by filtration and recrystallization from a suitable organic solvent, such as benzene, methanol or ethanol. Where the desired product is being dissolved in the reaction mixture, it is extracted with a suitable organic solvent, such as benzene or chloroform, the solvent is distilled off from the extract, and the residue is recrystallized from benzene, methanol or ethanol to obtain the purified end product.

The 2-alkoxytroponeimine derivatives having the above Formula II, which is employed as a starting material in the process of this invention, are novel compounds unknown in the prior art. These starting compounds may be easily prepared by reacting the corresponding 2-aminotropone derivatives with a dialkyl sulfate, for example, dimethyl sulfate or diethyl sulfate.

The following examples are given for illustration of the preferred embodiment of this invention, not by way of limiting the scope thereof.

EXAMPLE 1

To a solution of 2.1 g. of 2-methoxytroponeimine in 20 ml. of ethanol is added a solution of 0.9 g. of monomethylamine in 5 ml. of ethanol and the mixture is allowed to stand at room temperature for 2 days. After completion of the reaction, the ethanol is distilled off from the reaction mixture, the residue is dissolved in benzene and the benzene solution is subjected to alumina-chromatography. From the initially eluted fractions is obtained the crude crystalline substance, which is then recrystallized from methanol to give 0.9 g. of 2-methylamino-N-methyltroponeimine, melting at 67° C. And, from the subsequently eluted fractions is obtained the crude crystalline substance, which is then recrystallized from a mixture of benzene and cyclohexane to give 0.5 g. of 2-methylaminotroponeimine, melting at 64° C.

EXAMPLE 2

To a solution of 3.0 g. of 2-methoxytroponeimine in 30 ml. of ethanol is added 3.8 g. of isopropylamine and the mixture is allowed to stand at room temperature over night. After completion of the reaction, the ethanol is distilled off from the reaction mixture, the oily residue is dissolved in benzene and the benzene solution is subjected to alumina-chromatography.

From the initially eluted fractions is obtained the crude crystalline substance, which is then recrystallized from ethanol to give 1.1 g. of 2-isopropylamino-N-isopropyl-troponeimine, melting at 62° C. From the subsequently eluted fraction is obtained the crude oily substance, which is then distilled under reduced pressure to give 1.35 g. of 2-isopropylaminotroponeimine as yellow oily substance, boiling at 104–106° C./0.35 mm. Hg. The corresponding picrate of the latter is a yellow crystalline substance, melting at 127° C.

EXAMPLE 3

To a solution of 1.8 g. of 2-methoxytroponeimine in 30 ml. of ethanol is added 4 g. of benzylamine and the mixture is allowed to stand at room temperature for 2 days. After completion of the reaction, the reaction mixture is concentrated, chloroform is added to the residue and thereafter the chloroform solution is washed successively with 10% hydrochloric acid, 5% aqueous sodium carbonate and water, and is then dried over anhydrous sodium sulfate. The chloroform is distilled off, the residue is dissolved in benzene and the benzene solution is subjected to alumina-chromatography. From the initially eluted fractions is obtained the crude crystalline substance, which is then recrystallized from ethanol to give 0.9 g. of 2-benzylamino-N-benzyltroponeimine, melting at 82° C. From the subsequently eluted fractions is obtained the crude crystalline substance, which is then recrystallized from ethanol to give 1.7 g. of 2-benzylaminotroponeimine, melting at 80° C.

EXAMPLE 4

To a solution of 1,2 g. of 2-methoxytroponeimine in 20 ml. of ethanol is added 5.0 g. of aniline and the mixture is refluxed for 2.5 hours. After completion of the reaction, the reaction mixture is concentrated, the residue is dissolved in chloroform and the chloroform solution is washed successively with 10% hydrochloric acid, 5% aqueous sodium carbonate and water and is then dried over anhydrous sodium sulfate. The chloroform is distilled off, the crystalline residue is dissolved in benzene and then the benzene solution is subjected to alumina-chromatography. From the effluent is obtained the crude crystalline substance, which is then recrystallized from cyclohexane to give 0.8 g. of 2-anilinotroponimine as yellow prisms melting at 92° C.

EXAMPLE 5

To a solution of 10.0 g. of 2-methoxytroponeimine in 60 ml. of ethanol is added 30.0 g. of p-toluidine and the mixture is refluxed for 3 hours. After completion of the reaction, the reaction mixture is concentrated and 10% hydrochloric acid is added to the residue, whereby the crystalline substance is separated, which is then recovered by filtration. The crystalline substance thus obtained is shaken with chloroform and 5% aqueous sodium carbonate, the chloroform layer is separated from the mixture, washed with water, and dried over anhydrous sodium sulfate; thereafter, chloroform is distilled off to yield the crude substance, which is then recrystallized from cyclohexane to give 11.0 g. of 2-(p-toluidino)-troponeimine, melting at 87° C.

EXAMPLE 6

A solution of 3.0 g. of 2-methoxy-N-benzyl troponeimine in 30 ml. of ethanol is saturated with ammonia and the saturated solution is allowed to stand at room temperature for 3 days. After completion of the reaction, the reaction mixture is concentrated, the crystalline residue is dissolved in chloroform and the chloroform solution is subjected to alumina-chromatography. From the effluent is obtained the crude crystalline substance, which is then recrystallized from ethanol to give 1.8 g. of 2-amino-N-benzyltroponeimine, melting at 80° C.

EXAMPLE 7

To a solution of 1.0 g. of 2-methoxy-N-phenyltroponeimine in 15 ml. of ethanol is added 0.8 g. of aniline and the mixture is refluxed for 3 hours. After completion of the reaction, the reaction mixture is concentrated, the residue is shaken with chloroform and dilute hydrochloric acid, and the chloroform layer is separated. The chloroform solution is washed with aqueous sodium carbonate and then with water, and dried over anhydrous sodium sulfate. The chloroform is distilled off, the residual crystalline substance is dissolved in benzene and the benzene solution is subjected to alumina-chromatography. From the effluent is obtained the crude crystalline substance which is then recrystallized from ethanol to give 1.0 g. of 2-anilino-N-phenyltroponeimine, melting at 87° C.

EXAMPLE 8

To a solution of 0.4 g. of 2-methoxy-N-(p-tolyl)-troponeimine in 15 ml. of ethanol is added 0.4 g. of p-toluidine and the mixture is refluxed for 3 hours. After completion of the reaction, the reaction mixture is treated in the same manner as in Example 7 to give 0.5 g. of 2-(p-toluidino)-N-(p-tolyl)-troponeinime, melting at 143° C.

EXAMPLE 9

To a solution of 1.0 g. of 2-methoxy-N-(p-chlorophenyl)troponeimine in 15 ml. of ethanol is added 1.0 g. of p-chloroaniline and the mixture is refluxed for 5 hours. After completion of the reaction, the reaction mixture is treated in the same manner as in Example 7 to yield the crude crystalline substance, which is then recrystallized from ethyl acetate to give 0.8 g. of 2-(p-chloroanilino)-N-(p-chlorophenyl)troponeimine as red prisms, melting at 168° C.

EXAMPLE 10

To a solution of 1.0 g. of 2-methoxy-N-(p-methoxyphenyl)troponeimine in 15 ml. of ethanol is added 0.8 g. of p-anisidine and the mixture is refluxed for 3 hours. After completion of the reaction, the reaction mixture is treated in the same manner as in Example 7 to give 1.2 g. of 2-(p-anisidino)-N-(p-methoxyphenyl)-troponeimine as red needles, melting at 113° C.

EXAMPLE 11

To a solution of 1.0 g. of 2-methoxy-6-isopropyl-N-methyltroponeimine in 5 ml. of ethanol is added a solution of 1.0 g. of monomethylamine in 5 ml. of ethanol and the mixture is allowed to stand at room temperature for 2 days. After completion of the reaction, the ethanol is distilled off, the oily residue is dissolved in benzene, and the benzene solution is subjected to alumina-chromatography, whereby 0.9 g. of 2-methlyamino-6-isopropyl-N-methyltroponeimine is obtained as yellow oily substance. The corresponding picrate is a yellow leaf, melting at 198° C.

EXAMPLE 12

To a solution of 0.5 g. of 2-methoxy-3-phenyl-N-methyltroponeimine in 10 ml. of ethanol is added a solution of 1.0 g. of monomethylamine in 10 ml. of ethanol and the mixture is allowed to stand at room temperature for 2 days. After completion of the reaction, the ethanol is distilled off, the crystalline residue is dissolved in benzene and the benzene solution is chromatographed over alumina to give 0.4 g. of 2-methylamino-3-phenyl-N-methyltroponeimine as yellow oily substance. The corresponding picrate is an orange-yellow leaf, melting at 159° C.

We claim:
1. A process of preparing a compound of the formula

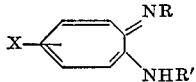

wherein X is hydrogen, straight or branched lower alkyl or phenyl; R and R' are each hydrogen, straight or branched lower alkyl, phenyl, phenyl substituted with chlorine, lower alkyl or lower alkoxy; or benzyl, provided that, when R and R' are the same, R is hydrogen, straight or branched lower alkyl, phenyl or phenyl substituted with chlorine, lower alkyl or lower alkoxy and when one of R and R' is hydrogen, the other is also hydrogen, which essentially consists of reacting a compound having the formula

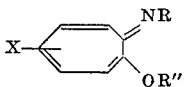

wherein R'' is a lower alkyl group and R and X are as defined above, with a compound having the formula

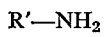

wherein R' is as defined above.

References Cited
UNITED STATES PATENTS 3,052,705  9/1962  Brasen et al. ____ 260—566 XR
3,119,831  1/1964  Homer _____ 260—566 XR CHARLES B. PARKER, *Primary Examiner.*

R. HINES, *Assistant Examiner.*

U.S. Cl. X.R.
260—309.6, 648